United States Patent
Keuser (10) Patent No.: US 10,696,124 B2
(45) Date of Patent: Jun. 30, 2020

(54) COUPLING DEVICE FOR A VEHICLE SUSPENSION

(71) Applicant: FORD GLOBAL TECHNOLOGIES, LLC, Dearborn, MI (US)

(72) Inventor: Joerg Keuser, Grevenbroich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 16/052,764

(22) Filed: Aug. 2, 2018

(65) Prior Publication Data

US 2019/0054784 A1 Feb. 21, 2019

(30) Foreign Application Priority Data

Aug. 16, 2017 (DE) .......................... 10 2017 214 235

(51) Int. Cl.
*B60G 21/10* (2006.01)
*B60G 21/055* (2006.01)
*B60G 17/005* (2006.01)

(52) U.S. Cl.
CPC ........... *B60G 21/10* (2013.01); *B60G 17/005* (2013.01); *B60G 21/055* (2013.01); *B60G 21/0551* (2013.01); *B60G 21/0556* (2013.01); *B60G 21/106* (2013.01); *B60G 2202/135* (2013.01); *B60G 2204/1224* (2013.01); *B60G 2204/46* (2013.01); *B60G 2206/427* (2013.01)

(58) Field of Classification Search
CPC .... B60G 21/10; B60G 21/055; B60G 21/106; B60G 21/0551; B60G 21/0556; B60G 2204/1224; B60G 2204/46; B60G 2206/427; B60G 2202/135; B60G 17/005

USPC .......................... 280/124.106, 5.511, 124.152
See application file for complete search history.

(56) References Cited

U.S. PATENT DOCUMENTS

| | | |
|---|---|---|
| 5,186,486 A | 2/1993 | Hynds et al. |
| 5,505,480 A | 4/1996 | Pascarella |
| 6,425,585 B1 | 7/2002 | Schuelke et al. |
| 6,481,732 B1 | 11/2002 | Hawkins et al. |
| 6,637,757 B2 | 10/2003 | Ignatius et al. |
| 6,659,475 B2 | 12/2003 | Clements et al. |

(Continued)

FOREIGN PATENT DOCUMENTS

| | | | |
|---|---|---|---|
| DE | 112013002755 T5 | 5/2015 | |
| FR | 2909930 A1 | 6/2008 | |
| GB | 2377415 A * | 1/2003 | ......... B60G 21/0556 |

(Continued)

*Primary Examiner* — Keith J Frisby
(74) *Attorney, Agent, or Firm* — Raymond L. Coppiellie; Brooks Kushman P.C.

(57) ABSTRACT

The disclosure relates to a coupling device for a stabilizer of a suspension. The coupling device has a first coupling portion and a second coupling portion that is supported thereon. One coupling portion has a connection location for the stabilizer and another coupling portion has a connection location for a wheel suspension. and the coupling device also has a locking device, which, in a locking position, limits a relative movement of the second coupling portion with respect to the first coupling portion in a first direction. In order to better protect a stabilizer from overload, the locking device is configured in a release position to release the relative movement when a first force acting between the connection locations exceeds a threshold value.

15 Claims, 3 Drawing Sheets

(56) References Cited

U.S. PATENT DOCUMENTS

2010/0090432 A1  4/2010  Hauser et al.
2016/0089951 A1  3/2016  Jeon et al.

FOREIGN PATENT DOCUMENTS

JP   S5977140 A      5/1984
JP   2002264625 A    9/2002

* cited by examiner

COUPLING DEVICE FOR A VEHICLE SUSPENSION

CROSS-REFERENCE TO RELATED APPLICATIONS

This application claims foreign priority benefits under 35 U.S.C. § 119(a)-(d) to DE Application 10 2017 214 235.9 filed Aug. 16, 2017, which is hereby incorporated by reference in its entirety.

TECHNICAL FIELD

The disclosure relates to a coupling device for a stabilizer of a vehicle suspension.

BACKGROUND

Stabilizers are used in modern motor vehicles in order to improve roll stability and consequently road position, in particular on bends. The stabilizer is, in this instance, arranged between wheels of an axle (front or rear axle), and connects of the wheels via levers and a torsion bar. The resilient action is achieved by rotation (torsion) of often round torsion bars. A central portion of the stabilizer, which forms the torsion bar, is rotatably arranged on bodywork, wherein angled ends that act as levers are fitted to elements of a wheel suspension, normally via vertically extending coupling rods. If one wheel is raised relative to the other, for example, in an event of single-sided loading on a bend, this brings about a torsion of the stabilizer, or the central portion. As a result of a resultant force, an opposing wheel is also raised, whereby an oblique position of the bodywork is limited.

In particular with off-road vehicles and SUVs, an extreme, one-sided deflection of a wheel may occur, particularly when the vehicle is used in an off-road sector. A significant deflection places, on the one hand, high demands on springs and shock-absorbers, but, on the other hand, also on the stabilizer. There is a significant torsion of the torsion rod that, when occurring repeatedly, may lead to material fatigue. This material fatigue may impair resilience of the stabilizer, or in the worst case even lead to the stabilizer breaking.

In principle, this danger may be overcome by the suspension being constructed to be more rigid so that spring excursion is reduced. Where applicable, however, this has an undesirable effect on an overall behavior of the suspension. It is also possible to limit the spring excursion via stop dampers that inevitably impairs even-sided redirection. It is further possible to construct the stabilizer in a more stable manner, whereby the stabilizer does, however, react in a more rigid manner, that is to say, even with slight, single-sided deflection. Furthermore, the stabilizer thereby becomes generally heavier.

US 2010/0090432 A1 discloses a coupling element for connecting a stabilizer to a transverse link. A cylinder portion of the coupling element is connected to the stabilizer, and a piston portion is connected to the transverse link. In this instance, a portion of the piston portion is arranged in a telescope-like manner in a recess of the cylinder portion. An inner wall of the cylinder portion has a groove in which locking elements can engage at a side of the piston portion. By an actuator and a mechanism that is arranged therebetween, locking elements can be adjusted in order to lock the cylinder portion and the piston portion with respect to each other, or to release them from each other. The latter leads to decoupling of the stabilizer from the wheel suspension that is intended to be carried out automatically during cross-country travel at a request of the driver.

A similar arrangement is set out in U.S. Pat. No. 6,659,475 B2, wherein a groove is provided in an outer wall of a piston portion, and wherein locking elements are arranged at a side of a cylinder portion, and, by an actuator, can be moved inward out of an inner wall of the cylinder portion. A decoupling may in this instance be actuated by a control unit that evaluates signals of sensors that, for example, measure a movement of transverse links.

Another concept for decoupling a stabilizer is known from U.S. Pat. No. 6,637,757 B2. In this instance, a torsion rod of a stabilizer is constructed in two halves, which are connected to each other by a coupling. The coupling may be released by an actuator, which in turn is controlled by a control unit. Similar concepts are known from U.S. Pat. No. 6,481,732 B1 and U.S. Pat. No. 6,425,585 B1. US 2016/089951 A1 also sets out a comparable concept, wherein furthermore stabilizer arms are connected to a respective wheel suspension by coupling elements. These coupling elements are not rigid, but instead comprise two portions that can be displaced slightly with respect to each other in a longitudinal direction, wherein two resilient elements that absorb tensile or pressure forces are interposed.

U.S. Pat. No. 5,186,486 A sets out a stabilizer arrangement for a motor vehicle in which at least one arm of a stabilizer is connected to a wheel suspension by an active connection arrangement. A housing portion of the connection arrangement is connected to the wheel suspension, whilst a rod element that is partially arranged in the housing is connected to the stabilizer arm. The rod element, which has a toothed rod at one side, is guided between a guiding roller and a toothed wheel. The toothed wheel can be controlled by a drive, wherein three operating modes are possible. A stopper element can be completely locked with respect to the housing, the stopper element may be freely movable, or an active adjustment of the rod element is carried out via the drive, whereby a stabilizer force is actively controlled.

U.S. Pat. No. 5,505,480 A discloses a stabilizer arrangement in which a stabilizer arm is connected by a coupling element to a wheel suspension. The coupling element has a cylinder and a resiliently loaded piston, which is arranged therein. The cylinder is filled with a hydraulic fluid, which can be replaced via a compensation line between an upper cylinder portion and a lower cylinder portion. If a gear mechanism of the vehicle is in a higher gear, the compensation line is blocked by an actuator, whereby the piston is hydraulically locked with respect to the cylinder. If the gear mechanism is in a low gear, the compensation line is opened so that the piston can be moved with respect to the cylinder.

In view of the prior art set out, protection of a stabilizer from overload still leaves room for improvement.

SUMMARY

An object of the disclosure is to better protect a stabilizer from overload.

It should be noted that the features and measures set out individually in the following description can be combined with each other in any technically advantageous manner, and set out other embodiments of the disclosure. The description additionally characterizes and specifies the disclosure in particular in connection with the Figures.

As a result of the disclosure, a coupling device is provided having a first coupling portion and a second coupling portion that is supported thereon, wherein one coupling portion has a connection location for a stabilizer, and the other coupling portion has a connection location for a wheel suspension. The coupling device is consequently constructed for connecting a stabilizer to a wheel suspension. In particular, it may be provided for connecting to a link of a wheel suspension, for example, a transverse link. It can be used in motor vehicles, such as, for example, passenger vehicles, or trucks, in particular in vehicles such as SUVs or off-road vehicles that are provided for off-road applications. The stabilizer serves in known manner to transmit, between the wheels of an axle, forces that occur in an event of a non-uniform or single-sided deflection. Such a stabilizer typically has a central portion, which in an installed state extends along a Y axis of the motor vehicle, and two end pieces that are arranged at an end side on the central portion. The central portion is provided to be rotatably secured to a vehicle chassis. The central portion may also be referred to as a stabilizer rear or torsion portion. The end pieces adjoin each other at both ends of the central portion and serve to connect mutually opposing wheels to the suspension. In the installed state, the end pieces are consequently, at least indirectly connected to the wheel suspensions. The end pieces may also be referred to as arms of the stabilizer, or stabilizer arms. A connection of the coupling device is carried out in this instance with one of the arms or end pieces of the stabilizer.

In a region of each of connection locations, a suitable bearing, for example, a ball bearing, may be provided in order to ensure a suitable, articulated connection to the stabilizer or the wheel suspension. In this instance, one connection location is arranged on the first coupling portion, and another connection location is arranged on the second coupling portion. An association of the two coupling portions with the stabilizer or the wheel suspension may be freely selected according to the disclosure, that is to say, the first coupling portion may have a connection location that is connected to the stabilizer, and the second coupling portion may have a connection location that is connected to the wheel suspension, or vice versa.

The two coupling portions are supported on each other, whereby a relative movement is possible, as will be explained in greater detail below. Consequently, the coupling portions are neither produced integrally with each other, nor rigidly connected to each other. Generally, each of the two components may be constructed in several pieces per se, and constitute a subassembly per se. Instead of a "coupling portion", it would also, for example, be possible to refer to a "coupling unit", "coupling subassembly" or the like.

Furthermore, the coupling device has a locking device that, in a locking position, limits a relative movement of the second coupling portion with respect to the first coupling portion in a first direction. Components of the locking device may in this instance be intended to be associated with the first coupling portion or the second coupling portion. Normally, the locking device is constructed in several pieces. If the locking device is in the locking position, the locking device limits or restricts relative movement of the second coupling portion in a first direction. In this instance, it is conceivable for a relative movement counter to the first direction to be possible in an unimpeded manner or, however, to be prevented or limited, for example, by a positive-locking connection between the first and second coupling portions. The relative movement in the first direction may in this instance be completely prevented by the locking device or, however, the relative movement is limited to a small movement extent.

According to the disclosure, the locking device is configured in a release position to release the relative movement when a first force acting between the connection locations exceeds a threshold value. The first force is in this instance generally a force that acts in a direction of a connection line of two connection locations. It may in this instance act either as a pressing force on a connection location in a direction toward the other connection location or, however, as a tensile force at a connection location away from the other connection location. Of course, the first force is strictly speaking a force pair.

Such a first force occurs when, as a result of a non-even-sided deflection of the wheels, a force is transmitted via the stabilizer from the wheel suspension at one side of the vehicle to the wheel suspension at the opposite side. A force transmission from the wheel suspension to the stabilizer is carried out in this instance via the coupling device. The stronger the non-even-sided deflection is, that is to say, a difference between deflection at one side and at another side, the greater a torsion load of the central portion of the stabilizer. In this instance, the first force acting between connection locations naturally becomes greater. In this instance, at one side of the stabilizer, that is to say, at one of the stabilizer arms, a tensile force acts and, at the other side of the stabilizer, a pressing force. In this instance, there is a clear connection between the first force and a load of the stabilizer. That is to say, it is possible to associate a corresponding threshold value of the first force with a provided load limit of the stabilizer. If the first force remains below the threshold value, it can be assumed that an overload of the stabilizer is prevented. As a result of released, relative movement, the coupling device gives way to some degree to the first force, that is to say, in a case of a pressing force, there is produced a shortening of spacing between the connection locations, and in an event of a tensile force, there is produced a lengthening of the spacing. This in turn leads to an at least partial relaxation of the stabilizer, wherein the first force is normally reduced. In this instance, the first force can act parallel with the first direction, or at an angle relative thereto. As a result of the relative movement, the second coupling portion can move from a starting position, which corresponds to some degree to a normal operation of the vehicle, into another position, which could be referred to, for example, as an "overload" position.

It is conceivable for the first force to be measured by a sensor, and for the locking device to be moved in accordance with measured values of the sensor by an (for example, electric) actuator into a release position. With regard to the most simple and robust construction, however, it is preferable for the locking device to be displaced by action of the first force into the release position. In this instance, it is possible to dispense with sensors and actuators, and displacement into the release position is brought about by the first force, wherein of course a redirection, and a weakening or strengthening of the first force (for example, by a translation) are possible. If a transmission of the first force to the locking device is carried out, the transmission is preferably carried out in a purely mechanical manner, although a hydraulic or pneumatic force transmission is possible in the context of the disclosure.

Movement of the second coupling portion with respect to the first coupling portion may, for example, be a rotation movement or pivot movement. In this instance, the first direction would be a tangential direction. In this instance, when the threshold value is exceeded, for example, a buckling of the second coupling portion with respect to the first coupling portion could be carried out, whereby a shortening of the spacing between the connection locations can also be achieved. However, the second coupling portion is preferably supported on the first coupling portion so as to be able to be displaced in translation. In this instance, the relative movement in the first direction is a translational displacement. In this instance, "translational" is intended to mean particularly, but not exclusively, that translational movement is a linear movement. The movement could also be carried out at least partially on a bent path, wherein, however, in contrast to a pure rotational movement, no location of the second coupling portion remains stationary with respect to the first coupling portion. The translational displaceability can be produced by a suitable guiding of the two coupling portions with respect to each other, which, for example, may involve a positive-locking connection.

Preferably, the second coupling portion has a piston portion that can be displaced inside a cylinder portion of the first coupling portion. Optionally, but not necessarily, an external cross-section of the piston portion may be adapted in such a manner to an inner cross-section of the cylinder portion that transversely, with respect to the displacement direction, a positive-locking connection is produced. For example, the mentioned cross-sections may both be circular, but in principle any other cross-sections are also conceivable. The cylinder portion forms an inner recess for receiving the piston portion. The cylinder portion does not, in this instance, have to be constructed in a fluid-tight manner, but instead the cylinder portion may be in free air exchange with the environment. Any positive-locking connection between the piston portion and cylinder portion also does not have to produce an air-tight closure, but instead the positive-locking connection is generally harmless if air can flow past the cylinder portion. The cylinder portion and/or the piston portion may be constructed at least partially, symmetrically relative to the first direction.

According to a preferred embodiment, the locking device has a flange portion that protrudes transversely relative to the first direction on a coupling portion and cooperates with at least one locking element on the other coupling portion, which locking element can be resiliently redirected, transversely relative to the first direction. The term "flange portion" is in this instance not intended to be understood to be limiting. It would also be possible to refer to a "collar portion" or a "protruding portion". The mentioned portion protrudes transversely relative to the first direction or protrudes transversely relative to the first direction in the direction toward the other coupling portion in each case. It cooperates with at least one locking element, which can be resiliently redirected, transversely relative to the first direction. In this instance, there is provision in the locking position for a positive-locking connection to be produced in the first direction between the flange portion and the locking element. As a result of resilient redirection of the locking element, displacement into a release position is carried out, wherein the positive-locking connection is cancelled. The flange portion can move past the locking element in the first direction (or vice versa). The locking element can be resiliently redirected, which, on the one hand, includes a possibility that the locking element is acted on by a resilient element, such as, for example, a spring and, on the other hand, that the locking element is generally constructed in a resilient manner, whereby redirection corresponds to a deformation of the resilient element.

In this instance, the flange portion is preferably arranged on the piston portion, and the at least one locking element is arranged on the cylinder portion. That is to say, in this embodiment, the flange portion protrudes outward, and the at least one locking element protrudes inward, inside the cylinder portion. During displacement into the release position, the locking element is moved either by a displacement, or a pivot movement at least partially outward so that a positive-locking connection in the first direction is cancelled.

In a simple and effective manner, displacement of the at least one locking element can be achieved in that the flange portion at a side facing in the first direction has a first chamfered portion that redirects the at least one locking element. As a result of chamfering, a force component that brings about a desired redirection of the locking element is produced from a force that acts in the first direction. An action of a chamfered portion can be compared with that of a wedge. Generally, the chamfered portion may be, for example, in the form of a cone surface, truncated cone surface or the like. The chamfered portion may be constructed in a symmetrical, but also asymmetrical manner. It is also conceivable for an inclination or obliqueness not to be constant with respect to the first direction.

Although a decoupling of the stabilizer from the wheel suspension is advantageous under extreme conditions, it is also desirable for the stabilizer under normal conditions to be coupled, again to some degree, independently. In this regard, it is preferable for the second coupling portion to be able to be returned by an action of a second force, which acts between the connection locations counter to the first force into a starting position counter to the first direction, wherein the locking device can be moved by action of the second force into the release position. If the first force is a pressing force, the second force is a pulling force and vice versa. Such a second force is produced, for example, when the second coupling portion is located in the overload position, and the wheel suspension returns from a state of extreme, one-sided deflection into a state of more, uniform deflection. In this instance, the stabilizer applies via the connection location that is associated therewith a force that seeks to return the second coupling portion into a starting position again. In some instances, for example, in the above-described embodiment with a flange portion and at least one locking element, a positive-locking connection prevents a direct return into the starting position. With a suitable embodiment, however, as a result of the action of the second force, the locking device can be displaced into the release position, whereby a return into a starting position is enabled.

Such a displacement may, for example, be achieved in that the flange portion has, at a side facing counter to the first direction, a second chamfered portion that redirects the at least one locking element. In this instance, as a result of the chamfered portion, from a force acting counter to the first direction, a force component acting in the transverse direction is also produced and brings about the desired redirection of the locking element. In the same manner as the first chamfered portion, the second chamfered portion may, for example, also be in the form of a cone surface, truncated cone surface or the like. It may be constructed in a symmetrical, but also asymmetrical manner, and an inclination thereof with respect to the first direction may be constant or non-constant.

Of course, in order to adjust the locking element again a given minimum size of the second force is required. In this instance, however, it is desirable for this minimum size to be smaller than the above-mentioned threshold value of the first force. On the one hand, a return into the starting position is intended to be carried out in the simplest manner possible as soon as the extreme driving situation is ended. On the other hand, it should be noted that (at least with a symmetrical construction of the stabilizer arms) the second force at one side of the stabilizer leads to a first force of the same size at the other side. With two similar coupling devices, there would be the risk that, in place of a return of the second device portion at one side (as a result of the second force), a displacement of the second device portion into the overload position at the other side (as a result of the first force) is carried out. This can be prevented if a second threshold value for the second force, which is required to displace the locking element, is smaller than the above-mentioned (first) threshold value for the first force. This can be achieved by the first chamfered portion being more powerfully inclined with respect to the first direction than the second chamfered portion.

Other advantageous details and actions of the disclosure are explained in greater detail below with reference to different embodiments that are illustrated in the Figures, in which:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different Figures, identical components are always provided with the same reference numerals, for which reason they are generally also only described once.

Figure 1:
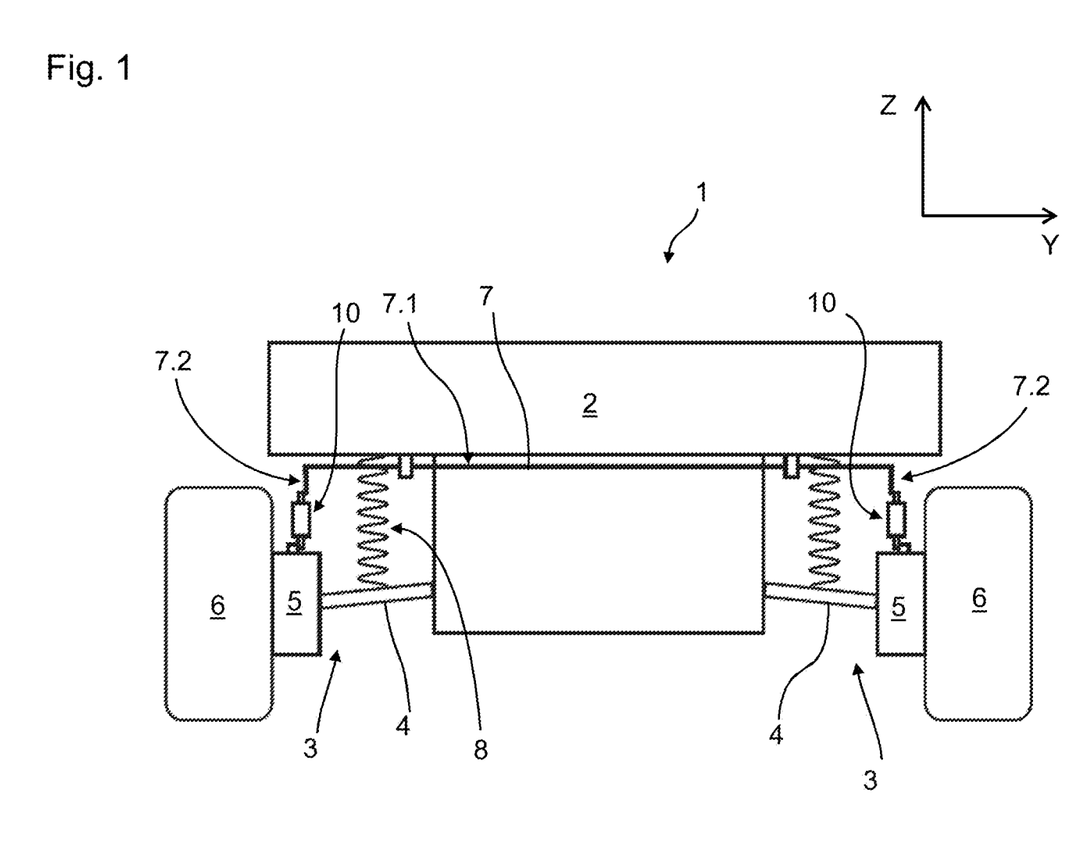
FIG. 1 shows a portion of a motor vehicle having two coupling devices according to the disclosure.

FIG. 1 is a schematic view of a portion of a motor vehicle 1, for example, an SUV or an off-road vehicle. In this instance, two, wheel carriers 5 on which vehicle wheels 6 are supported are connected by transverse links 4 to a vehicle structure 2. The vehicle structure 2 is further supported by springs 8 on the transverse links 4. The transverse links 4 form, together with the wheel carriers 5, a wheel suspension 3. The two, wheel suspensions 3 are coupled to each other by a stabilizer 7 that extends in a transverse direction (along the Y axis), and in a known manner has a central portion 7.1 and adjacent stabilizer arms 7.2. The stabilizer arms 7.2 are each connected by a coupling device 10 to a wheel suspension 3 (in this instance, to the wheel carrier 5).

In a normal operating state of the vehicle 1, there is produced a uniform, or slightly non-uniform, deflection of the two wheels 6, wherein there is carried out via the coupling devices 10 a force transmission to the stabilizer 7 that leads to a torsion of the central portion 7.1. However, if there is an extreme, one-sided deflection of a wheel 6, which, for example, may occur during cross-country journeys, a resultant deformation of the stabilizer 7 could lead to direct damage, or at least contribute to premature material fatigue.

In order to prevent this premature material fatigue, each coupling device 10 is not rigid per se, but instead has a structure illustrated in FIGS. 2 to 5. In this instance, the coupling device 10 has a first coupling portion 11 and a second coupling portion 14 that is displaceably arranged thereon. A first connection location 12 for connecting to the stabilizer arm 7.2 is associated with the first coupling portion 11, whilst a second connection location 15 for connecting to the wheel suspension 3 is associated with the second coupling portion 14. Each of the connection locations 12, 15 has a ball joint 13, 16. It should be noted that association of the first and second coupling portions 11, 14 with the stabilizer 7, or with the wheel suspension 3 could also be transposed.

Figure 2:
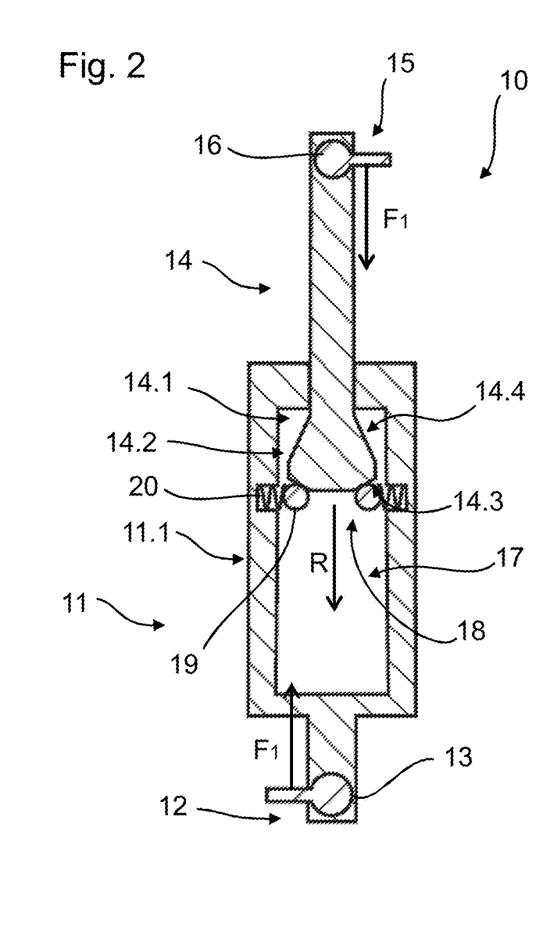
FIG. 2 is a sectioned illustration of a coupling device from FIG. 1 in a first position.
Figure 3:
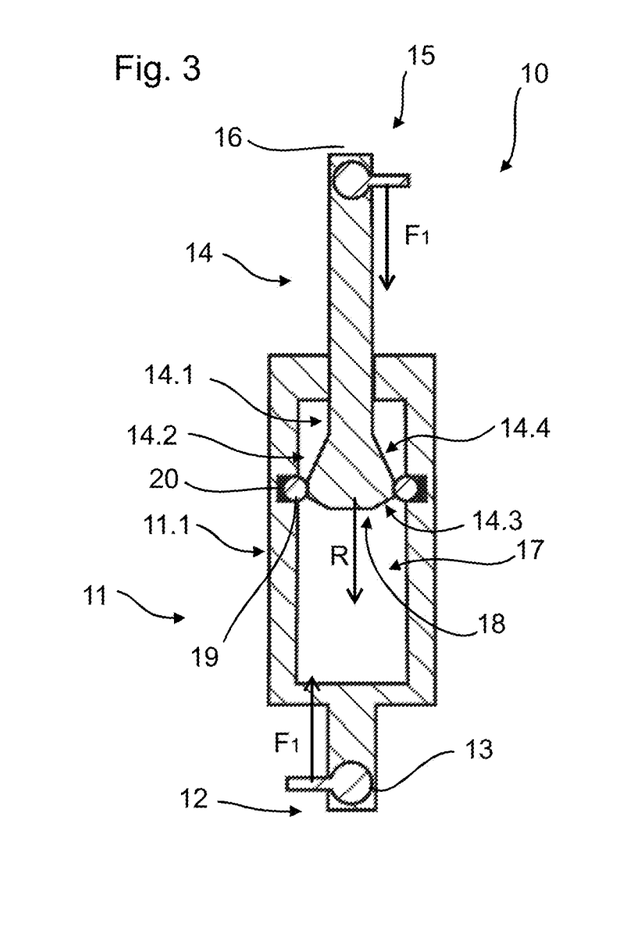
FIG. 3 is a sectioned illustration of the coupling device from FIG. 2 in a second position.

The first coupling portion 11 has a cylinder portion 11.1 having a recess 17 inside which a piston portion 14.1 of the second coupling portion 14 is displaceably arranged. In this instance, the second coupling portion 14 in FIG. 2 is in a starting position that corresponds to a normal travel operation of the vehicle, for example, on even or moderately uneven roads. In this instance, a displacement between the first and second coupling portions 11, 14 is limited by a locking device 18 that has a flange portion 14.2, which is formed on the piston portion 14.1, and a plurality of locking elements 19. The locking elements 19 are in each case secured by springs 20 to an inner wall of the cylinder portion 11.1. If the springs 20, as in FIG. 2, are in a relaxed state, in a first direction R, a positive-locking connection is produced between the flange portion 14.2 and the locking elements. The first direction R corresponds to a displacement of the second coupling portion 14 toward the first coupling portion 11. As a result of a positive-locking connection mentioned, a relative movement in the first direction R is limited as long as the locking device 18 is located in a locking position as shown in FIG. 2.

If a pressing force $F_1$ is acting between the connection locations, a first chamfered portion 14.3 of the flange portion 14.2 is pressed against the locking elements 19. The first chamfered portion 14.3 has in this example a shape of a truncated cone, and an inclination of approximately 70° with respect to the first direction R. This value is intended to be understood to be purely exemplary and may of course be varied. As a result of the inclination of the first chamfered portion 14.3, there is produced on the locking elements 19, a force component that acts transversely relative to the first direction and is pressed outward counter to a force of the springs 20. If the pressure force $F_1$ exceeds a provided, first threshold value, a positive-locking connection between the flange portion 14.2 and the locking elements 19 is cancelled, whereby the locking device 18 is located in a release position shown in FIG. 3. The first threshold value is in this instance selected in such a manner that an excessive loading of the stabilizer 7 is prevented.

Figure 4:
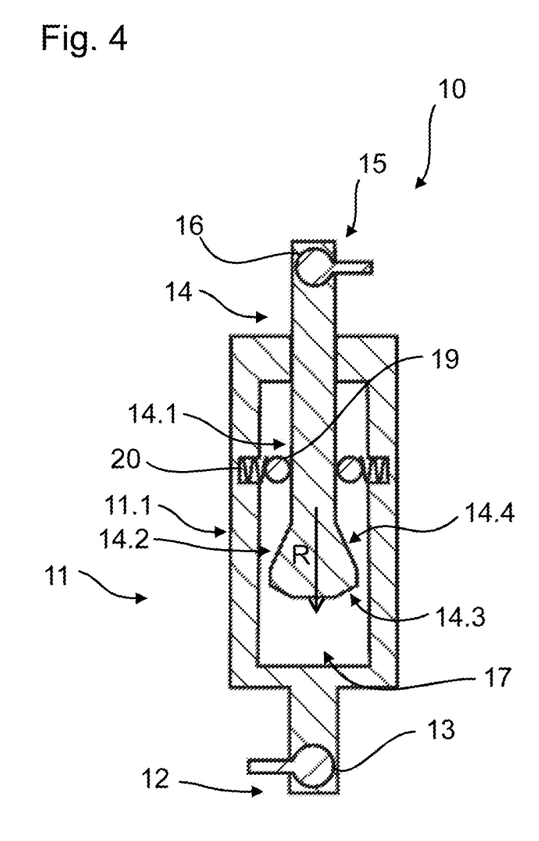
FIG. 4 is a sectioned illustration of the coupling device from FIG. 2 in a third position.

After the flange portion 14.2 has passed the locking elements 19, the second coupling portion 14 moves further into an overload position, which is shown in FIG. 4. The locking elements 19 are again located in this instance in a locking position. As a result of shortening of spacing between the connection locations 12, 15, there is produced a relaxation of the stabilizer 7 that protects the stabilizer 7 from damage. A force acting between the connection locations 12, 15 is also thereby at least partially dissipated. A corresponding shortening of the coupling device 10 is carried out in this instance only at one side, whilst the coupling device 10 at an opposing side retains an original length.

As soon as excessive, one-sided deflection is ended, and both wheels 6 are again substantially at a same height (with respect to the Z axis), the stabilizer 7 transmits a force between the two coupling devices 10 that counteracts shortening of the coupling device 10 shown. In this instance, there is acting between the connection locations 12, 15, a tensile force $F_2$ by which the second coupling portion 14 is returned counter to the first direction R out of the overload position in a direction toward the starting position. This is prevented in principle by the locking elements 19 that are again located in the locking position. In order to facilitate a return to the starting position, the flange portion 14.2 has a second chamfered portion 14.4 that is also in a form of a truncated cone. However, an inclination of the second chamfered portion 14.4 with respect to the first direction R is at approximately 30° significantly lower.

Figure 5:
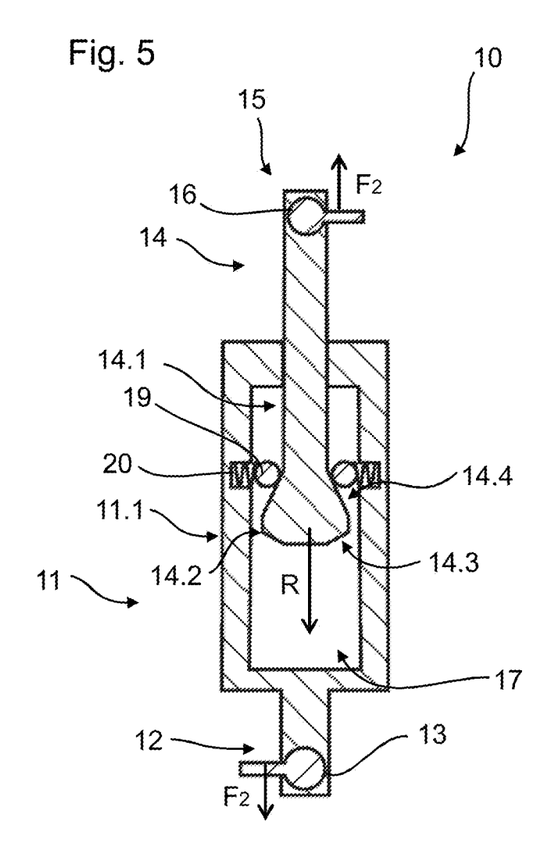
FIG. 5 is a sectioned illustration of the coupling device from FIG. 2 in a fourth position.

If the second chamfered portion 14.4 cooperates with the locking elements 19, as shown in FIG. 5, from the tensile force $F_2$ there is produced, on the locking elements 19, a force component that acts laterally in an outward direction, and by which the locking elements 19 are moved again into the release position. As a result of greater chamfering, a second threshold value for the tensile force $F_2$, which is required for lateral redirection of the locking elements 19, is substantially below the first threshold value for the pressing force $F_1$. It is thereby in particular ensured that the pressing force, which acts at a same time with another coupling device 10, does not exceed the first threshold value, which would lead, in an undesirable manner, in both coupling devices 10 to the second coupling portion 14, being in the overload position.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A coupling device for a vehicle suspension comprising:
a first coupling portion and a second coupling portion supported on the first coupling portion, wherein the first coupling portion has a connection location for a stabilizer and the second coupling portion has a connection location for a wheel suspension, the second coupling portion including a piston portion displaced inside a cylinder portion of the first coupling portion; and
a locking device that limits, in a locking position, a relative movement of the second coupling portion with respect to the first coupling portion in a first direction, wherein the locking device is configured, in a release position, to release the relative movement responsive to a first force, acting between the connection locations, exceeding a threshold value, wherein the locking device has a flange portion protruding transversely relative to the first direction on the second coupling portion and cooperating with at least one locking element on the first coupling portion, the locking element being resiliently redirected, transversely relative to the first direction, and wherein the flange portion has, at a side facing the first direction, a first chamfered portion that redirects the at least one locking element.

2. The coupling device as claimed in claim 1, wherein the locking device is displaced into the release position by the first force.

3. The coupling device as claimed in claim 1, wherein the second coupling portion is supported on the first coupling portion such that the second coupling portion is displaced in translation.

4. The coupling device as claimed in claim 1, wherein the flange portion is arranged on the piston portion, and the at least one locking element is arranged on the cylinder portion.

5. The coupling device as claimed in claim 1, wherein the second coupling portion is returned by an action of a second force that acts between the connection locations counter to the first direction into a starting position, wherein the locking device can be displaced by action of the second force into the release position.

6. The coupling device as claimed in claim 5, wherein the flange portion has, at a side facing counter to the first direction, a second chamfered portion that redirects the at least one locking element.

7. The coupling device as claimed in claim 6, wherein the first chamfered portion is inclined with respect to the first direction compared to the second chamfered portion.

8. A vehicle comprising:
a coupling, connected between a stabilizer and wheel suspension, having a second coupling portion supported on a first coupling portion; and
a lock that limits, in a locked position, movement of the second coupling portion relative to the first coupling portion in a first direction, wherein the lock is configured, in a released position, to release the movement responsive to a first force, acting on the coupling, exceeding a threshold, wherein the lock has a flange having a first chamfered portion that transversely protrudes relative to the first direction on the second coupling portion, and cooperates with a lock element on the first coupling portion, the lock element being resiliently redirected, transversely relative to the first direction.

9. The vehicle as claimed in claim 8, wherein the second coupling portion is returned by an action of a second force that acts on the coupling counter to the first direction into a starting position, wherein the lock is displaced by action of the second force into the released position.

10. The vehicle as claimed in claim 9, wherein the flange has, at a side facing counter to the first direction, a second chamfered portion that redirects the lock element.

11. The vehicle as claimed in claim 10, wherein the first chamfered portion is inclined with respect to the first direction compared to the second chamfered portion.

12. A vehicle suspension comprising:
a coupling, connected between a stabilizer and wheel suspension, having cylinder and piston portions, wherein the piston is supported in the cylinder; and
a lock that limits, in a locked position, movement of the piston relative to the cylinder in a first direction, wherein the lock is configured, in a released position, to release the movement responsive to a first force, acting on the coupling, exceeding a threshold, wherein the lock has a flange with a first chamfer that transversely protrudes relative to the first direction on the piston, and cooperates with a lock element on the cylinder, the lock element being resiliently redirected, transversely relative to the first direction.

13. The vehicle suspension as claimed in claim 12, wherein the piston is returned by an action of a second force that acts on the coupling counter to the first direction into a starting position, wherein the lock is displaced by action of the second force into the released position.

14. The vehicle suspension as claimed in claim 13, wherein the flange has, at a side facing counter to the first direction, a second chamfer that redirects the lock element.

15. The vehicle suspension as claimed in claim 14, wherein the first chamfer is inclined with respect to the first direction compared to the second chamfer.

* * * * *